United States Patent
Ogawa et al.

(10) Patent No.: US 8,140,836 B2
(45) Date of Patent: Mar. 20, 2012

(54) INFORMATION PROCESSING APPARATUS AND PROGRAM

(75) Inventors: Tomoya Ogawa, Hachioji (JP);
Tomohiro Suzuki, Nishitokyo (JP);
Tetsuya Ishikawa, Hachioji (JP);
Fumikage Uchida, Asaka (JP);
Munetoshi Eguchi, Hachioji (JP);
Hiroaki Yago, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 895 days.

(21) Appl. No.: 12/188,080

(22) Filed: Aug. 7, 2008

(65) Prior Publication Data

US 2009/0063840 A1    Mar. 5, 2009

(30) Foreign Application Priority Data

Aug. 30, 2007    (JP) ................................ 2007-224832

(51) Int. Cl.
*G06F 9/24* (2006.01)

(52) U.S. Cl. ................ 713/1; 713/2; 713/100; 711/113; 710/316

(58) Field of Classification Search ................. 713/1, 2, 713/100; 711/113; 710/316
See application file for complete search history.

(56) References Cited

U.S. PATENT DOCUMENTS

| 6,513,113 | B1* | 1/2003 | Kobayashi | 713/2 |
| 6,859,876 | B2* | 2/2005 | Dykes et al. | 713/2 |
| 7,966,486 | B2* | 6/2011 | Huang et al. | 713/2 |
| 2009/0150661 | A1* | 6/2009 | Yago et al. | 713/2 |

\* cited by examiner

*Primary Examiner* — M. Elamin
(74) *Attorney, Agent, or Firm* — Squire Sanders (US) LLP

(57) ABSTRACT

If a defect flag stored in a CF 19 while a BIOS is being booted, an information processing device 10 boots a second program stored in an external device 31 connected to a connection section 21, and if the defect flag is not detected, the information processing device 10 confirms whether or not the first program is bootable. If the first program is confirmed to be bootable, the first program is booted and if not, the defect flag is set in the CF 19 and the power of the information processing apparatus 10 is turned off.

9 Claims, 2 Drawing Sheets

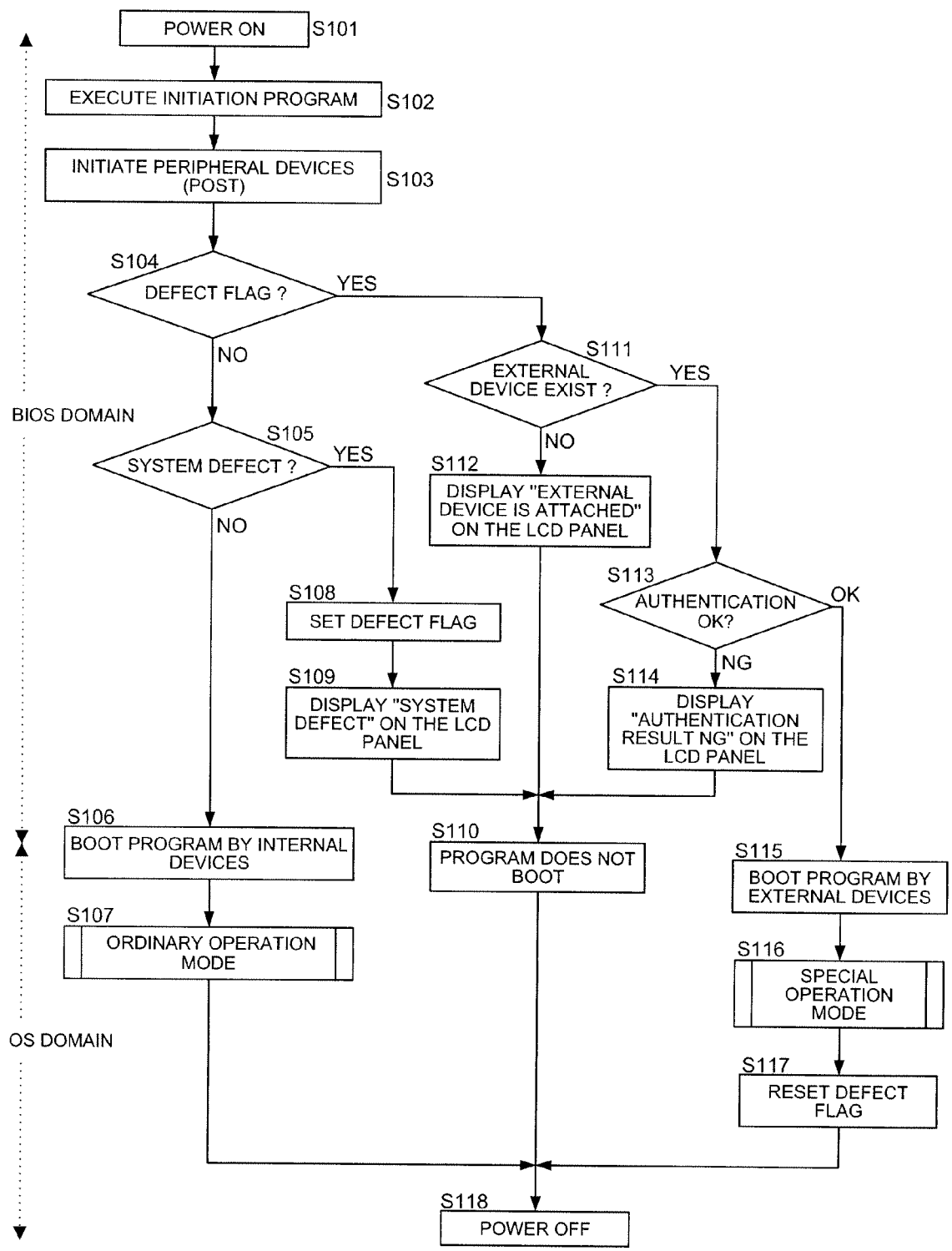

INFORMATION PROCESSING APPARATUS AND PROGRAM

This application is based on Japanese Patent Application No. 2007-224832 filed on Aug. 30, 2007, in Japanese Patent Office, the entire content of which is hereby incorporated by reference.

BACKGROUND OF THE INVENTION

The present invention relates to an information processing apparatus and a program provided with a function to boot control of the program while booting a BIOS (Basic Input/Output System).

In an information processing apparatus (computer system) such as a personal computer, assigning of a boot drive is determined by setting the BIOS (BIOS setup menu) in a way that drives are booted from the drive to which higher priority is assigned. Usually, an external memory media (external devices) is assigned to be a highest priority, thus with the external memory media being connected, by turning on the power, the external memory media starts booting. Also, if the power is turned on without the external devices being connected, an internal device assigned to be next priority such as a HDD (Hard Disk Drive) is booted and a program stored in the internal device is booted so that the apparatus can be used in normal operation (for example, refer to Unexamined Japanese Patent Application Publication No. 2002-215399). Further, in the internal device, in many cases user data is stored (in the information processing apparatus such as a copying machine and a multifunction peripheral, scanned data and so on) beside the program.

In the above information processing apparatus, if the internal program cannot be booted due to a defect of a file system of the internal program or the HDD device itself, the apparatus cannot be booted. To recover the defect, the HDD device has to be replaced however the user data may not be read out any more.

Also, a countermeasure to attempt recovering by boosting an external program in an external recording medium has been carried out when the internal program cannot be booted. However, when a user wish to use the apparatus in the normal operation after booting by the external recording medium, if the power is turned on without detaching the external recording medium, the apparatus cannot be used in the normal operation because the external recording medium boots the apparatus. As above, it is not preferable that booting starts from the external recording medium by detecting the external recording medium left to be attached to the apparatus and as a result the apparatus cannot be used in normal operation contrarily to an intention of the user.

Therefore, it is required to provide an information processing apparatus and a program which enable booting by the external recording medium only when the internal program is in an unbootable state, and enable recovery and diagnosis of defects by the external program stored in the external recording medium.

SUMMARY OF THE INVENTION

The present invention exists in the followings.
1) An information processing apparatus, having:
    a first recording medium to store a first program;
    a second recording medium to store a second program;
    a connection section to which the second recording medium can be connected from outside;
    a memory section to store unbootable information indicating an unbootability of the first program;
    a control section to confirm whether or not the unbootable information is stored in the memory section while a BIOS is being booted,
    boot the second program stored in the second recording medium connected to the connection section when storage of the unbootable information in the memory section is confirmed,
    confirm whether or not the first program is bootable when storage of the unbootable information in the memory section cannot be confirmed,
    boot the first program when a bootability of the first program is confirmed,
    store the unbootable information in the memory section when the bootability of the first program cannot be confirmed, and turn off power of the information processing apparatus
2) A medium having computer-executable instructions to control an information processing apparatus, having:
    confirming whether or not unbootable information indicating an unbootability of a first program stored in a first recording medium while a BIOS is being booted;
    booting a second program stored in a second recording medium connected to a connection section when storage of the unbootable information in the memory section is confirmed;
    confirming whether or not the first program is bootable when storage of the unbootable information in the memory section cannot be confirmed;
    booting the first program when a bootability of the first program is confirmed;
    storing the unbootable information in the memory section when the bootability of the first program cannot be confirmed; and
    turning off power of the information processing apparatus.

In the above configuration, whether or not unbootable information to indicate that the first program stored in the recording medium (internal device) is unbootable is stored in the memory section is confirmed. In case the unbootable information cannot be confirmed, whether or not the first program is bootable is confirmed, and if the bootability is confirmed, the first program is booted without booting from the second recording medium even if the second recording medium (external device) is connected to a connection section of the information processing device. In case the bootability of the first program cannot be confirmed, unbootable information to indicate that the first program is unbootable is stored in the memory section and the power is tuned off.

After turning off the power, when the power is turned on again in a state where the second recording medium is connected to the connection section of the information processing apparatus, the unbootable information stored in the memory section is confirmed during booting BIOS, and the second program stored in the second recording medium connected to the connection section is booted.

Thereby, booting from the second recording medium becomes possible only when the first program (internal program) is in the unbootable state. Then, when the first program becomes unbootable, the second program (external program) stored in the second recording medium can conducts recovery and diagnosis of the defect. Also, since the first program is booted if the first program is bootable without booting from second recording medium even if the power is turned on in the state where the second medium is connected to the apparatus, it is possible to avoid a problem that the apparatus cannot be used in the normal operation through the first program contrary to the intention of the user because the second recording medium is left without being disconnected from the apparatus then the second recording medium boots.

In items (1) and (2), by storing the booting disable information in the memory section, even if the power is turned on and off, booting can be conducted from the second recording medium based on the unbootable information stored in the memory section. Then, in the above configuration, after booting the second program, the unbootable information is deleted. Thereby, if the defect is recovered and the first program becomes bootable afterward, even if the second recording medium is connected, from next booting of apparatus onward, the apparatus is booted from the first recording medium. Also, if the defect is not yet recovered and the first program is unbootable, the unbootable information is stored in the memory section again, and the apparatus is booted from the second recording medium being connected at next booting of the apparatus.

BRIEF DESCRIPTION OF THE DRAWINGS

FIG. 2 is a flow chart indicating operation of boot of an information processing apparatus related to an embodiment of the present invention.

DETAILED DESCRIPTION OF THE PREFERRED EMBODIMENT

Figure 1:
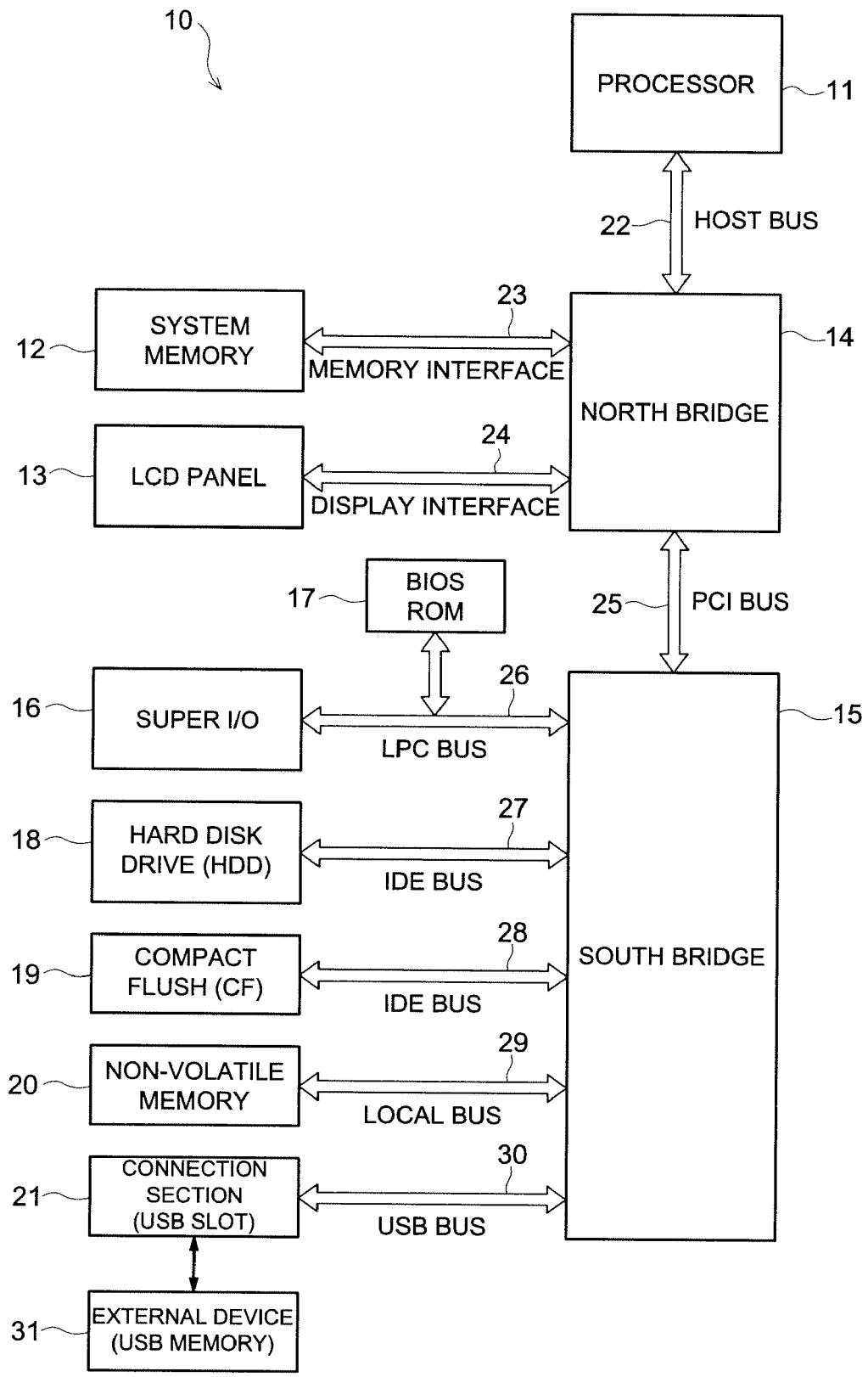
FIG. 1 is a control block diagram indicating a relevant configuration of an information processing apparatus related to an embodiment of the present invention.

An embodiment of the present invention will be described with reference to the drawings.

FIG. 1 shows relevant configuration of an information processing apparatus 10 related to the present invention.

The information processing apparatus 10 is configured as a digital multifunction peripheral provided with a copying function to read a document to form an image corresponding on a recording sheet and to output, a scanner function, printer function and a facsimile function. As FIG. 1 shows, the information processing apparatus 10 is provided with a processor 11, a system memory 12, a LCD (Liquid Crystal display) panel 13, a north bridge 14, a south bridge 15, a super I/O (super Input/Output) 16, a BIOS ROM (Basic Input/Output System Read Only Memory) 17, a HDD 18, a CF (COMPACT FLASH™) 19, a nonvolatile memory 20 and a connection section 21 to which an external device 31 is to be connected. Namely, the information processing apparatus 10 is equipped with a computer system to execute various kinds of functions.

The processor 11 having a calculation processing function is connected to the north bridge 14 via a host buss 22.

The memory system 12 is a nonvolatile memory commonly used for storing a program the processor 11 execute and a work memory the processor 11 execute the program and for storing image data, and connected to the north bridge 14 via a memory interface 23. LCD panel 13 having a function as a display section to display various guide signs and states is connected to the north bridge 14 via a display interface 24.

The north bridge 14 is configured including a host-PCI bridge to connect a host buss 22 and a PCI (Peripheral Component Interconnect) bus 25, a memory controller to control access to the system memory 12, a cache controller to control access to an unillustrated cache memory and a display controller to control display operation of the LCD panel 13.

South bridge 15 is connected to the north bridge 14 via the PCI bus 25 and configured including a PCI-LPC bridge to connect the PCI bus 25 with a LPC (Low Pin Count) bus 26, a PCI-IDE bridge to connect the PCI bus 25 with an IDE (Integrated Drive Electronics) buses 27 and 28, a PCI-local bridge to connect the PCI bus 25 with a local bus 29, a PCI-USB bridge to connect the PCI bus 25 with a USB (Universal Serial Bus) bus 30, a LPC controller, an IDE controller, a Local Bus Controller, a USB Controller, an interruption controller to propagate interruption request from peripheral devices to the processor 11 judging from the priority thereof and generate an interruption request signal.

The super I/O 16 is provided with a basic I/O such as a mouse controller, a key board controller, a flexible disk cartridge drive controller, and a serial/parallel port, and connected to the south bridge 15 via the LPC bus 26.

The BIOS ROM 17 is a ROM (Read Only Memory) storing the BIOS representing a group of programs to control the peripheral devices such as the HDD 18 connected to the information processing device 10, an unillustrated disk drive, a keyboard and a video card and is configured with, for example, EPROM (Erasable Programmable Read Only Memory). The BIOS provides basic input/output devices for the peripheral devices connected to the information processing apparatus 10 to OS (Operating System) or various kinds of programs (Application Software).

As settings by the BIOS, there is quoted, setting of data and time, setting of the peripheral devices such as disk drives, devices and video cards, and setting of priority of the boot drives (boot devices). As to the priority of boot drive, in an initial state, the external device 31 is set as a first priority and the HDD 18 is set as a second priority. However, booting form the external device 31 is subject to detection of a defect flag to be described later. Also, a BIOS setup menu is not disclosed to the public for a purpose of assuring security. The BIOS setup menu is opened and a menu screen is displayed only in case a person is authenticated by inputting, for example, a specified ID or pass ward through the keyboard.

The HDD 18 (the first recording medium) having functions to store the OS to control operation of the information processing apparatus 10, the first program operates on the OS and image data (scanned data), is connected to the south bridge 15 via the IDE bus 27.

The CF 19 is a memory card which is a kind of erasable flush memory. CF 19 has a function to store various kinds of data and defect flags and a function to backup data to be stored in a nonvolatile memory 20. This CF 19 is attached to the information processing apparatus 10 internally in a way that detaching of the CF 19 is impossible or difficult via an unillustrated connection section (CF slot), and through the connection section, the CF 19 is connected with the south bridge 15 via the IDE bus 28.

The nonvolatile memory 20 is provided with a function to store various specific parameters of devices and is connected to the south bridge 15 via the local bus 29.

The connection section 21 is configured with an USB slot and connected with the south bridge 15 via the USB bus 30.

The external device 31 (the second recording medium) is configured with an USB memory and can be connected or disconnected (detachable) to the connection section 21 from an outside of the information processing apparatus 10. The external device 31 stores a specified release key file storing a specified release key (authentication information), the OS and the second program.

The specified release key is a user setting or a specified pass word/authentication code of the device, for example, "xyz2006025" which is arbitrarily set. Also, the second program stored in the external device 31 includes recovery tools and diagnosis tools (malfunction coping program) to cope with the defects that the HDD 18 representing a boot drive in the apparatus is disabled to boot due to occurrence of system malfunction in the information processing apparatus 10, and operates on the OS stored in the external device 31.

The recovery/diagnosis tools are, for example, a HDD recovery program to recover a case that the HDD 18 representing the boot drive cannot be detected or the first program is damaged, a memory check program to conduct checking and diagnosis of contents of an entire area of the memory in details in case a defect is identified though the checking of the system memory 12, and a system diagnosis program to conduct diagnosis in case a defect is identified in data read from the nonvolatile memory 20.

Next, operation at booting (boot operation) of the information processing apparatus 10 having the above configuration will be described.

FIG. 2 shows a flow of a process carried out at boot (power on) of the information processing apparatus 10.

When the information processing apparatus 10 is powered on (Step S101), an initiation program in the BIOS program stored in the BIOS ROM 17 is loaded and executed (Step S102), and initiation of the video card, memory checking and initiation of the peripheral devices (Power On Self Test: POST) are conducted (Step S103). Meanwhile, memory check by the BIOS is system check to confirm whether or not the memory is equipped. For example, presence of data for each specified area (considerably large) is observed to check whether or not the memory is equipped.

When initiation of the peripheral devices is completed, whether or not a defect flag is stored in the CF 19 is confirmed (Step S104). If the defect flag is detected (Step S104: Yes), operation proceeds to Step S111, and if the defect flag is not detected (Step S104; No), operation proceeds to Step S105.

The defect flag used in the present processing indicates whether or not boot from the HDD 18 representing the boot drive in the apparatus storing the first program is possible. Flag "off" indicates that boot is possible (initial value) and flag "on" indicates that boot is impossible due to some troubles (system malfunction).

Also, as the defect flags, a plurality of kinds of flags are provided in accordance with symptoms (kids of defects). For example, in case the HDD 18 (internal device) to be the boot drive cannot be detected or the first program (internal program) is damaged, an internal device defect flag is set. In case a defect is detected through check of the system memory 12, a system memory defect flag is set. In case a defect is detected in the data read from the nonvolatile memory 20, a nonvolatile memory defect flag is set.

Each defect flag indicating defect of the internal device, the system memory and the nonvolatile memory is information including unbootable information indicating that the first program is unbootable and detailed defect information indicating the kid of the defect. If these defect flags are detected, the first program is judged to be unbootable and the symptom is determined by the kind of the defect flag. These defect flags are stored in a memory area which cannot be initialized by memory check after boot (after turn on power) of the information processing apparatus 10 or initialization (Step S103) of the devices.

In case the operation proceeds to Step S105 without the defect flag being detected in Step S104 (Step S104; No), whether or not system malfunction occurs is checked. If the system malfunction is detected (Step S105;Yes) the operation proceeds to Step S108. In case system malfunction cannot be detected (Step S105; No), whether or not boot from the internal device is possible is checked and the apparatus is booted from the HDD 18 representing the boot drive (Step S106).

For boot from the HDD 18, master boot record (MBR) is loaded to the system memory 12 and control is shifted to the boot program written thereon. The boot program searches a boot partition in the HDD 18 and retrieves a leading position of the boot partition in a partition table to load a boot selector onto the system memory 12. The program recorded in the boot selector loads an OS loader onto the system memory 12 and passes control to the OS of the HDD 18. The OS of the HDD 18 boots the first program (internal program) to control operation of the information processing apparatus 10, thus the information processing apparatus 10 operate in normal operation mode (Step S107).

In the information processing apparatus 10 configured as a digital multifunction peripheral such as the present embodiment, copy function, scanner function, printer function and facsimile function become operative in the normal operation mode. Also, when operation of power running off of the information processing apparatus 10 is conducted, the normal operation mode is terminated to turn off the power source (Step S118).

In case system malfunction is detected in Step S105 (Step S105; Yes) and operation proceeds to Step S108, a defect flag according to the symptom of system malfunction is set. For example, in case the HDD 18 cannot be detected or the first program is damaged, an internal device malfunction flag is set. In case malfunction is detected through check of the system memory 12, a system memory malfunction flag is set. In case malfunction is detected in the data read from the nonvolatile memory 20 a nonvolatile memory malfunction flag is set.

After setting the flag, "system malfunction" is displayed on the LCD panel 13 to notify the user (Step S109) and the power source of the information processing apparatus 10 is turned off (Step S118) without booting the first program stored in the HDD 18 (Step S110).

Also, in case a defect flag is detected in Step S104 (Step S104;Yes) and operation shifts to Step S111, whether or not the external device 31 (USB memory) is connected to the connection section 21 is confirmed. If it is connected (Step S111;Yes), operation shifts to Step S113. If it is not connected (Step S111; NO), "Connect the external device" is displayed to notify the user (Step S112), and turn off the power source of the information processing apparatus 10 (Step S118) without booting the first program stored in the HDD 18 (Step S110).

In case the external device 31 is connected (Step S111;Yes) and operation shifts to step S113, the contents of the specified release key file (authenticate information file) is confirmed to judge authentication (Step S113). Specifically, fixed sector in which the specified release key file of the external device 31 is read to obtain the specified release key (for example, xyz20060625) and whether or not the external device 31 is a device allowed to boot is judged.

For example, if the external device 31, in which the specified release key file does not exist or an unspecified release key file storing an unspecified release key different from the specified release key exists, is connected to boot the information processing device 10, in contents confirmation of specified release key file (Step S113), the specified release key cannot be authenticated thus boot from the external device 31 is not allowed. If the boot from the external device 13 is not allowed (Step S113; NG), "Authentication result NG" is displayed on the LCD panel 13 to notify the user (Step S114), the power source of the information processing apparatus 10 is turned off (Step S118) without booting the second program stored in the external device 31 (Step S110).

If the contents of the specified release key file is correct (the specified release key is authenticated) (Step S113; OK), boot from the external device 31 is allowed, and the program (recovery/diagnosis tool) in the external device 31 to be booted is determined in accordance with the kind of the defect flag. Specifically, in case the internal device defect flag is detected, boot of a HDD recovery program is determined. If the system memory malfunction flag is detected, boot of the memory check program is determined. If the nonvolatile memory malfunction flag is detected, boot of the system diagnosis program is determined.

When determination of the program to be booted is completed, boot from the external device 31 is conducted. Thereby, the OS in the external device 31 is booted and the program in the external device 31 determined in accordance with the kind of the defect flag is booted (Step S115), then the information processing apparatus 10 operates in a special operation mode (Step S116).

In the special operation mode, recovery and diagnosis in accordance with the symptom of system malfunction can be conducted by the program booted from the external device 31.

For example, in case of the HDD recovery program, errors of the file system can be automatically recovered. Also, recovery can be carried out with a rule that unnecessary sectors of OS are not used.

In case of memory check program, warning to lead a user to replace the memory system 12 or the circuit board can be issued based on the diagnosis result of the default of the memory system 12.

Also, in case data right before turning off the power of the apparatus is backed up in the CF 19, the system diagnosis program notifies the user that there is a possibility of recovery of the data by reading out the data from CF 19. Recovery operation can be started depending on use's choice.

Then, when power turning off operation of the information processing apparatus 10 is carried out, the defect flag stored in the CF 19 is reset (Step S117), the special operation mode is terminated and the power source of the apparatus is tuned off (Step S118).

As above, in the information processing apparatus 10 of the present embodiment, boot from the external device 31 becomes possible only when the first program stored in the HDD 18 is in an unbootable state. Then when the first program becomes unbootable, recovery and diagnosis of the defect becomes executable by the second program stored in the external device 31. In the present embodiment, the plurality of kids of the defect coping programs can appropriately cope with the plurality of kids of the defects which disables the first program to be booted, and in addition, possibilities to determine the cause of the defect and to recover are enhanced.

Also, even if the apparatus is powered on with the external device 31 being connected with the apparatus, in case the first program is bootable, the first program is booted without booting from the external device 31, therefore, for example, it is avoided that boot from the external device 31 is conducted by detecting the external device 31 having been left without being disconnected and as a result the apparatus cannot be used in the normal operation through the first program contrary to the intention of the user.

Also, by storing the defect flags in the CF 19, boot from the external device 31 becomes possible based on the defect flags stored in CF 19 irrespective of power on or off. After booting the second program, if the first program becomes bootable after the defect is recovered, by deleting the defect flag, the apparatus can be booted from the first recording medium from the next boot of the apparatus onward, even if the external device 31 is connected with the apparatus. Also, if the defect is not recovered and the first program is not bootable, the defect flag is again set and at the next boot of the apparatus, the apparatus boots from the external device 31.

Also, in the present embodiment, by authenticating external device 31 (USB memory) which is enabled to be connected with the connection section 21 from the outside in respect to where or not the specified release key can be obtained, only a program (a specified program) stored in the external device 31 along with the specific release key is allowed to be boot and the other programs (unspecified programs) are not allowed to be booted. Thereby, for example, it can be avoided that the unspecified programs stored in the external device 31 is booted and a program in the information processing apparatus 10 is accessed using the unspecified programs. Therefore, while maintaining security of the information processing apparatus 10, the boot drive can be changed to the external device 31 (USB memory) at BIOS level.

Also, the boot drive can be changed to the external device 31, while the BIOS is booting, without carrying out operation to change the priority of the boot drives in the BIOS setup menu, and since the program stored in the external device 31 is booted in the BIOS level (It is booted independent from the OS installed in the information processing apparatus 10), a program having a high freedom degree not depending on the OS of the apparatus side can be configured.

In other words, in case the boot drive is changed to the external device 31 while the BIOS is being booted, the program (the second program) in the external device 31, can use an unique OS stored in the external device 31 or a special program not having OS so that the degree of freedom is enhanced. Also, the second program does not depend on the OS of the apparatus side or the program (the first program), the OS of the apparatus side does not have to be rearranged to suit the program of the external device 31, and the only program installed in the external device 31 has to be rearranged, thus the program installed in the external device 31 can be rearranged in any place as far as a personal computer is available.

As above, while the embodiments of the present invention have been described with reference to the drawings, specific configurations are not limited to the embodiments described and it is to be understood that changes and variations may be made without departing from the spirit or scope of the invention.

For example, for the first recording medium configured as a HDD 18 in the embodiment, various kinds of memory cards, storage devices installed in the information processing apparatus 10 or ROM having other standard can be used. The second recording medium configured as the external device 31 in the embodiment is not limited to the USB memory. For example, removable disks such as a flexible disk cartridge and a MO (Magneto Optical disk) or various kinds of memory cards can be used as the second recording medium.

Also, in the boot processing in the embodiment, the BIOS of the information processing apparatus 10 detects the defect flag, and according to the kind of the defect flags detected (each defect flag of the internal device, the system memory or the nonvolatile memory), the program (each program i.e. HDD recovery, memory check and system diagnosis) in the external device 31 to be booted is determined. However, the boot program can be determined by the OS of the external device 31 to refer the kind of the defect flag. Also, the defect flag set by detecting occurrence of the defect, is reset after the program in the external device 31 is booted, however the flag can be remained to be set (maintained) until the defect is recovered then the flag can be reset after recovery.

Also, the defect flag includes unbootable information indicating that the program in the internal device (HDD 18) is unbootable and detailed defect information indicating the kind of the defect. However, exclusive flags and code information indicating individual information or code information can be used. For example, an unbootable flag indicating only being unbootable, a code information indicating the kind of the defect and a plurality of detailed defect flags.

Also, in the embodiment, the case where authentication of the external device (the second recording medium) is authenticated while the BIOS is being booted, however, the present invention can be applied to an external device which is not authenticated (in which no authentication information is stored). Namely, the present invention can be applied to a configuration wherein if the defect flag is detected while BIOS is being booted, the apparatus is booted (the second program boots the apparatus) without authenticating the external device connected to the apparatus.

Also, the present invention can be applied to the other information processing apparatuses such as personal computers without the present invention being limited to the digital multifunction peripheral described in the embodiment.

According to the information processing apparatus and the program related to the present invention, booting from the external recording medium is enabled only when the internal program is in the unbootable state, and the external program stored in the external recording medium can carry out recovery and diagnosis of the defects.

What is claimed is:

1. An information processing apparatus, comprising:
    a first recording medium to store a first program;
    a connection section to which a second recording medium can be connected from outside;
    a memory section to store unbootable information indicating an unbootability of the first program;
    a control section to confirm whether or not the unbootable information is stored in the memory section while a BIOS is being booted, to boot the second program stored in the second recording medium connected to the connection section when storage of the unbootable information in the memory section is confirmed, to confirm whether or not the first program is bootable when storage of the unbootable information in the memory section cannot be confirmed, to boot the first program when the bootability of the first program is confirmed, and to store the unbootable information in the memory section and turn off power of the information processing apparatus when the bootability of the first program cannot be confirmed,
    wherein when the bootability of the first program cannot be confirmed, the second program, including a plurality of kinds of defect coping programs corresponding to kinds of defects which disable the first program to be booted, stores detailed defect information indicating a kind of a defect in the memory section, and when the second program is booted, the defect coping program corresponding to the kind of the defect indicated by the detailed defect information stored in the memory section is booted.

2. The information processing apparatus of claim 1, wherein the plurality of the kinds of the defect coping programs includes recovery programs to recover the defects and diagnosis programs to diagnose the defects.

3. The information processing apparatus of claim 1, wherein the unbootable information stored in the memory sect on is deleted after booting the second program.

4. The information processing apparatus of claim 1, wherein while the BIOS is being booted, authentication of the second recording medium connected to the connection section is carried out so that the second program is allowed to be booted only when the second recording medium is authenticated.

5. The information processing apparatus of claim 1, wherein the first recording medium provided inside the information processing apparatus is an internal device including a storage device and a ROM, and the second recording medium is an external device including an USB memory.

6. The information processing apparatus of claim 1, wherein the authentication information used to authenticate the second recording medium is a password or an authentication code.

7. A non-transitory computer readable medium having computer-executable instructions to control an information processing apparatus for performing steps, comprising:
    confirming whether or not unbootable information indicating an unbootability of a first program stored in a first recording medium while a BIOS is being booted;
    booting a second program stored in a second recording medium connected to a connection section when storage of the unbootable information in a memory section is confirmed;
    confirming whether or not the first program is bootable when storage of the unbootable information in the memory section cannot be confirmed;
    booting the first program when the bootability of the first program is confirmed;
    storing the unbootable information in the memory section when the bootability of the first program cannot be confirmed; and
    turning off power of the information processing apparatus,
    wherein when the bootability of the first program cannot be confirmed, the second program, including a plurality of defect coping programs corresponding to kinds of defects which disable the first program to be booted, stores detailed defect information indicating a kind of a defect in the memory section, and when the second program is booted, the defect coping program corresponding to the kind of the defect indicated by the detailed defect information stored in the memory section is booted.

8. The medium of claim 7 having computer-executable instructions to control the information processing apparatus, wherein the unbootable information stored in the memory section is deleted after the second programs is booted.

9. The medium of claim 7 having computer-executable instructions to control the information processing apparatus, wherein while the BIOS is being booted, authentication of the second recording medium connected to the connection section is carry out so that the second program is allowed to be booted only when the second recording medium is authenticated.

* * * * *